US012451641B2

(12) United States Patent
Han

(10) Patent No.: US 12,451,641 B2
(45) Date of Patent: Oct. 21, 2025

(54) TYPE-C SIGNAL TRANSMISSION CONNECTOR

(71) Applicant: HIROSE KOREA CO., LTD., Siheung-si (KR)

(72) Inventor: Min Yeon Han, Siheung-si (KR)

(73) Assignee: HIROSE KOREA CO., LTD., Siheung-si (KR)

( * ) Notice: Subject to any disclaimer, the term of this patent is extended or adjusted under 35 U.S.C. 154(b) by 316 days.

(21) Appl. No.: 18/143,472

(22) Filed: May 4, 2023

(65) Prior Publication Data

US 2023/0369799 A1 Nov. 16, 2023

(30) Foreign Application Priority Data

May 10, 2022 (KR) ........................ 10-2022-0057411

(51) Int. Cl.
*H01R 13/506* (2006.01)
*H01R 13/639* (2006.01)

(52) U.S. Cl.
CPC ......... *H01R 13/506* (2013.01); *H01R 13/639* (2013.01); *H01R 2201/26* (2013.01)

(58) Field of Classification Search
CPC ........................... H01R 13/506; H01R 13/516; H01R 13/6273; H01R 13/639; H01R 13/641
See application file for complete search history.

(56) References Cited

U.S. PATENT DOCUMENTS 5,772,465 A * 6/1998 Hwang .............. H01R 13/6592
439/607.05
9,680,256 B1 * 6/2017 Lane .................. H01R 13/6275
2022/0294147 A1 * 9/2022 Lee ...................... H01R 13/405
2025/0055219 A1 * 2/2025 Bachorz ............... H01R 24/545

* cited by examiner

*Primary Examiner* — Oscar C Jimenez
(74) *Attorney, Agent, or Firm* — Maschoff Brennan

(57) ABSTRACT

Disclosed herein is a type-C signal transmission connector. The type-C signal transmission connector includes: an inner housing receiving a USB plug and a cable therein; an outer housing surrounding the inner housing; and a retainer mounted on the inner housing and the outer housing, wherein the retainer has an outer locking portion and a protrusion, the outer locking portion is caught by a catching portion formed on the outer housing, and the protrusion is coupled to an inner protrusion receiving portion formed on the inner housing.

10 Claims, 11 Drawing Sheets

(a)

(b)

(a)

(b)

(a)

(b)

TYPE-C SIGNAL TRANSMISSION CONNECTOR

TECHNICAL FIELD

Embodiments of the present invention relate to a Type-C signal transmission used in an automotive media control unit (MCU) module.

BACKGROUND

In recent years, type-C USB connectors, which are smaller in size than conventional type-A or type-B USB connectors and have a free connection direction, have become widely used.

Such a type-C connector is different from conventional type-A and type-B connectors in that the type-C connector is formed in an up-down and left-right symmetrical shape such that the coupling direction of a plug connector and a receptacle connector is not limited.

When used in automotive applications, a type-C signal transmission connector serves to electrically connect parts of a vehicle and is subjected to various safety tests to prevent occurrence of electrical failure when mounted on the parts of the vehicle. A conventional connector includes a female connector housing and a male connector housing, which are mutually detachable, wherein interconnected female and male connecters are prevented from being separated from each other through coupling between securing members provided to the housings.

However, during operation of a vehicle, a plug cable may undergo displacement due to vibration or the like, resulting in electrical failure.

Therefore, there is a need for a type-C signal transmission connector that can prevent displacement of a plug cable when used in automotive applications.

RELATED LITERATURE

Patent Document

Korean Patent Laid-open Publication No. 10-2017-0077553 (2017.07.06.)

SUMMARY

Embodiments of the present invention are conceived to solve such problems in the art and it is one object of the present invention to provide a type-C signal transmission connector in which an inner housing receiving a USB plug and a cable therein includes an inner protrusion receiving portion and an outer protrusion receiving portion such that, upon coupling the inner housing to a retainer, an inner protrusion and an outer protrusion of the retainer are inserted into and caught by the inner protrusion receiving portion and the outer protrusion receiving portion, respectively, to double-fasten both sides of the cable, thereby preventing the cable from being separated from the connector.

It is another object of the present invention to provide the type-C signal transmission connector in which an outer locking portion of the retainer is caught by a catching portion of an outer housing such that the inner housing and the outer housing can be held in place, and a connector position assurance (CPA) member is provided to assure that the cable is held in place, thereby preventing electrical failure.

It is a further object of the present invention to provide the type-C signal transmission connector which can be coupled to a type-C USB port-equipped connector vertically or at a right angle to the type-C USB port-equipped connector depending on the installation space, whereby coupling between the two connectors can be achieved in a manner that suits the installation environment of an automotive media control unit (MCU) module.

It is yet another object of the present invention to provide the type-C signal transmission connector in which the CPA member is caught by the retainer to be prevented from moving out of place, thereby assuring that the cable is held in place and thus preventing electrical failure.

In accordance with an aspect of the present invention, a type-C signal transmission connector includes: an inner housing receiving a USB plug and a cable therein; an outer housing surrounding the inner housing; and a retainer mounted on the inner housing and the outer housing, wherein the retainer has an outer locking portion and a protrusion, the outer locking portion is caught by a catching portion formed on the outer housing, and the protrusion is coupled to an inner protrusion receiving portion formed on the inner housing.

The protrusion of the retainer may include an inner protrusion and an outer protrusion.

The inner protrusion may include at least two inner protrusions.

The outer protrusion may include a pair of outer protrusions, and the inner protrusion may be located between the pair of outer protrusions.

The outer housing may include a CPA member coupled thereto, wherein the CPA member is movable in a longitudinal direction of the connector.

The retainer may limit a range of movement of the CPA member.

The protrusion of the retainer may prevent the CPA member from being separated rearwards from the outer housing.

The outer protrusion may be located in front of the inner protrusion.

The outer housing may include a CPA member coupled thereto, wherein the CPA member is movable in a perpendicular direction with respect to the longitudinal direction of the connector.

The outer housing may have a right-angled shape.

The retainer may have a stopper inserted into a receiving groove formed on the CPA member to form a section in which the retainer and the CPA member overlap each other, whereby the CPA member can be caught by the stopper to be prevented from being separated rearwards from the outer housing.

In the type-C signal transmission connector according to the present invention, the inner housing receiving the USB plug and the cable therein includes the inner protrusion receiving portion and the outer protrusion receiving portion such that, upon coupling the inner housing to the retainer, the inner protrusion and the outer protrusion of the retainer are inserted into and caught by the inner protrusion receiving portion and the outer protrusion receiving portion, respectively, to double-fasten both sides of the cable, thereby preventing the cable from being separated from the connector.

In addition, according to the embodiments of the present invention, the outer locking portion of the retainer is caught by the catching portion of the outer housing such that the inner housing and the outer housing can be held in place, and the connector position assurance (CPA) member is provided to assure that the cable is held in place, thereby preventing electrical failure.

In addition, according to the embodiments of the present invention, the type-C signal transmission connector can be coupled to a type-C USB port-equipped connector vertically or at a right angle to the type-C USB port-equipped connector depending on the installation space, whereby coupling between the two connectors can be achieved in a manner that suits the installation environment of an automotive media control unit (MCU) module.

In addition, according to the embodiments of the present invention, the CPA member is caught by the retainer to be prevented from moving out of place, thereby assuring that the cable is held in place and thus preventing electrical failure.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Hereinafter, embodiments of the present invention will be described with reference to the accompanying drawings.

The above and other aspects, features, and advantages of the present invention will become apparent from the detailed description of the following embodiments in conjunction with the accompanying drawings.

It should be understood that the present invention is not limited to the following embodiments and may be embodied in different ways, and that the embodiments are provided for complete disclosure and thorough understanding of the present invention by those skilled in the art. The scope of the present invention is defined only by the claims.

In addition, descriptions of known functions and constructions which may unnecessarily obscure the subject matter of the present invention will be omitted.

Figure 1:
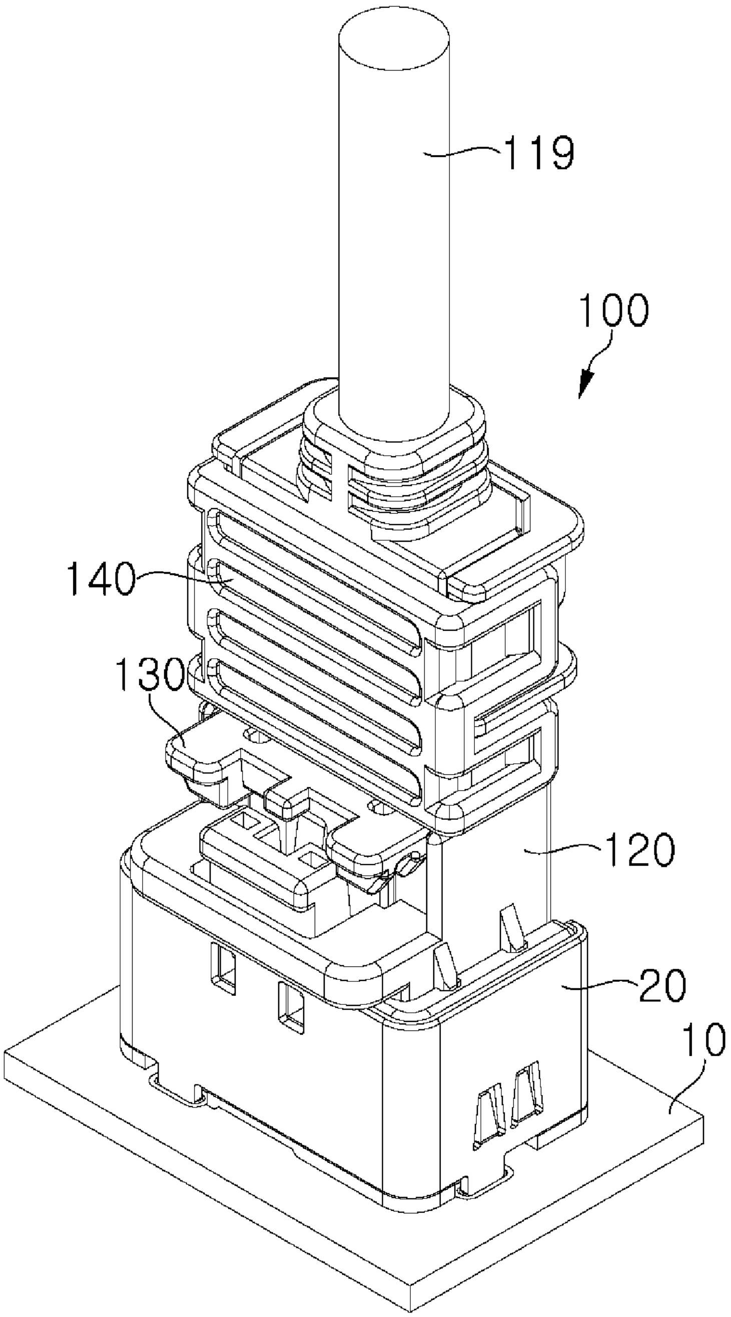
FIG. 1 is a view of a vertical type-C signal transmission connector according to one embodiment of the present invention, with a type-C USB port-equipped connector coupled thereto.
Figure 2:
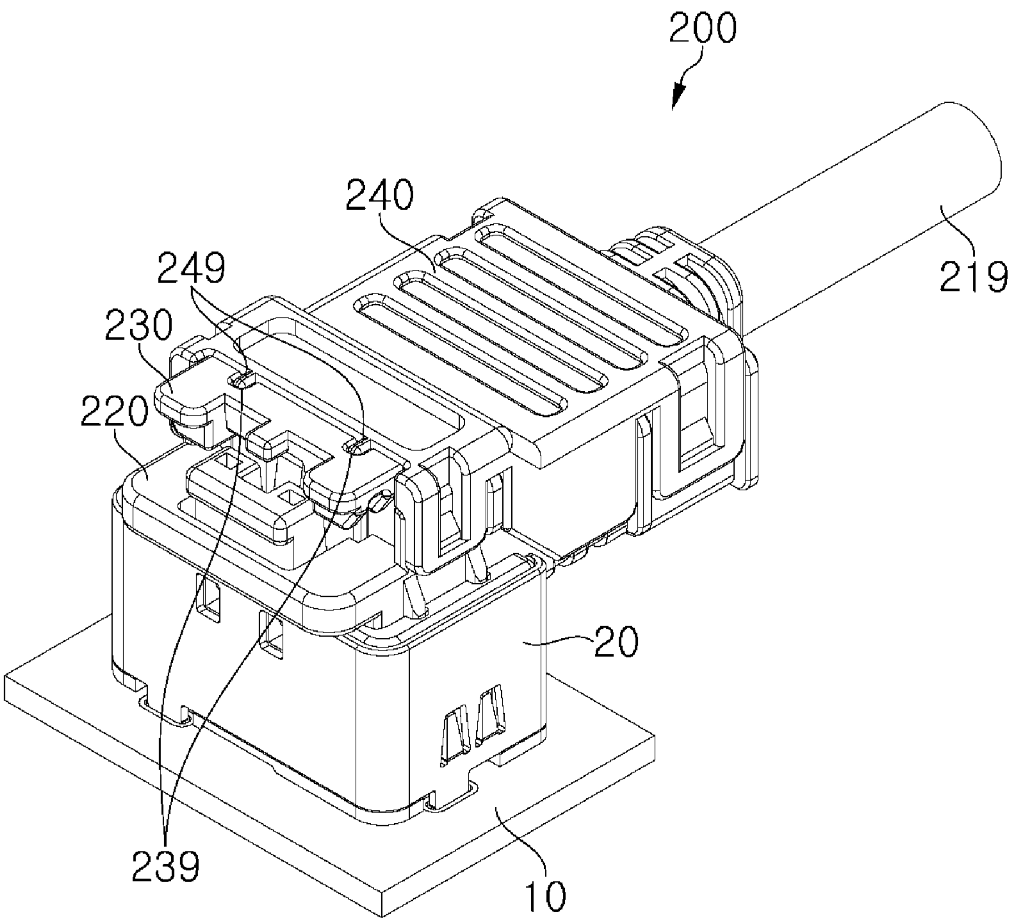
FIG. 2 is a view of a right-angled type-C signal transmission connector according to one embodiment of the present invention, with a type-C USB port-equipped connector coupled thereto.
Figure 3:
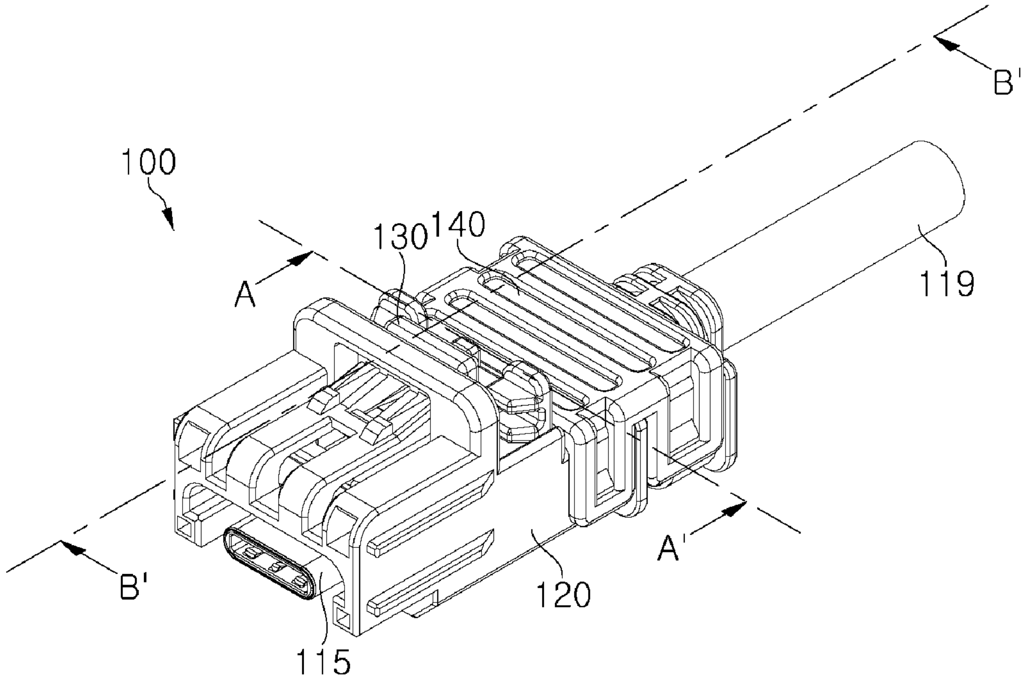
FIG. 3 is a top and bottom perspective view of the vertical type-C signal transmission connector according to the embodiment.
Figure 3:
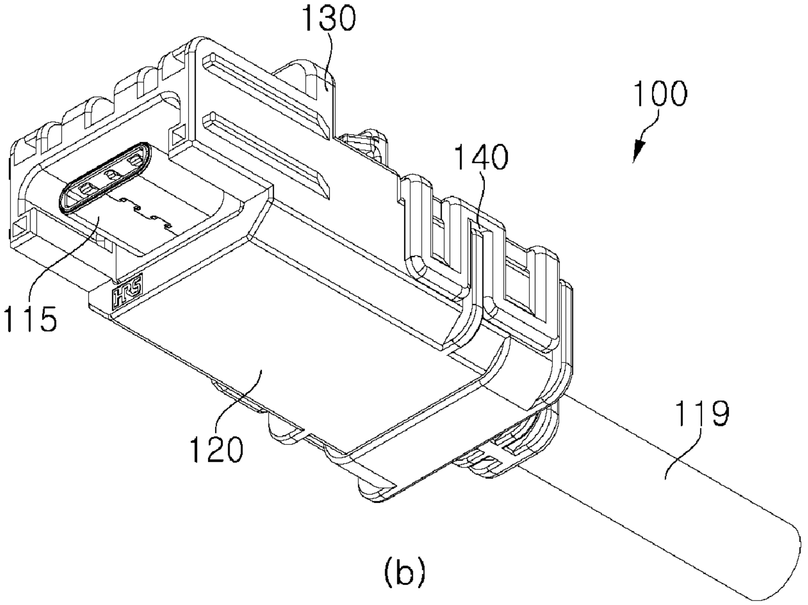
Figure 4:
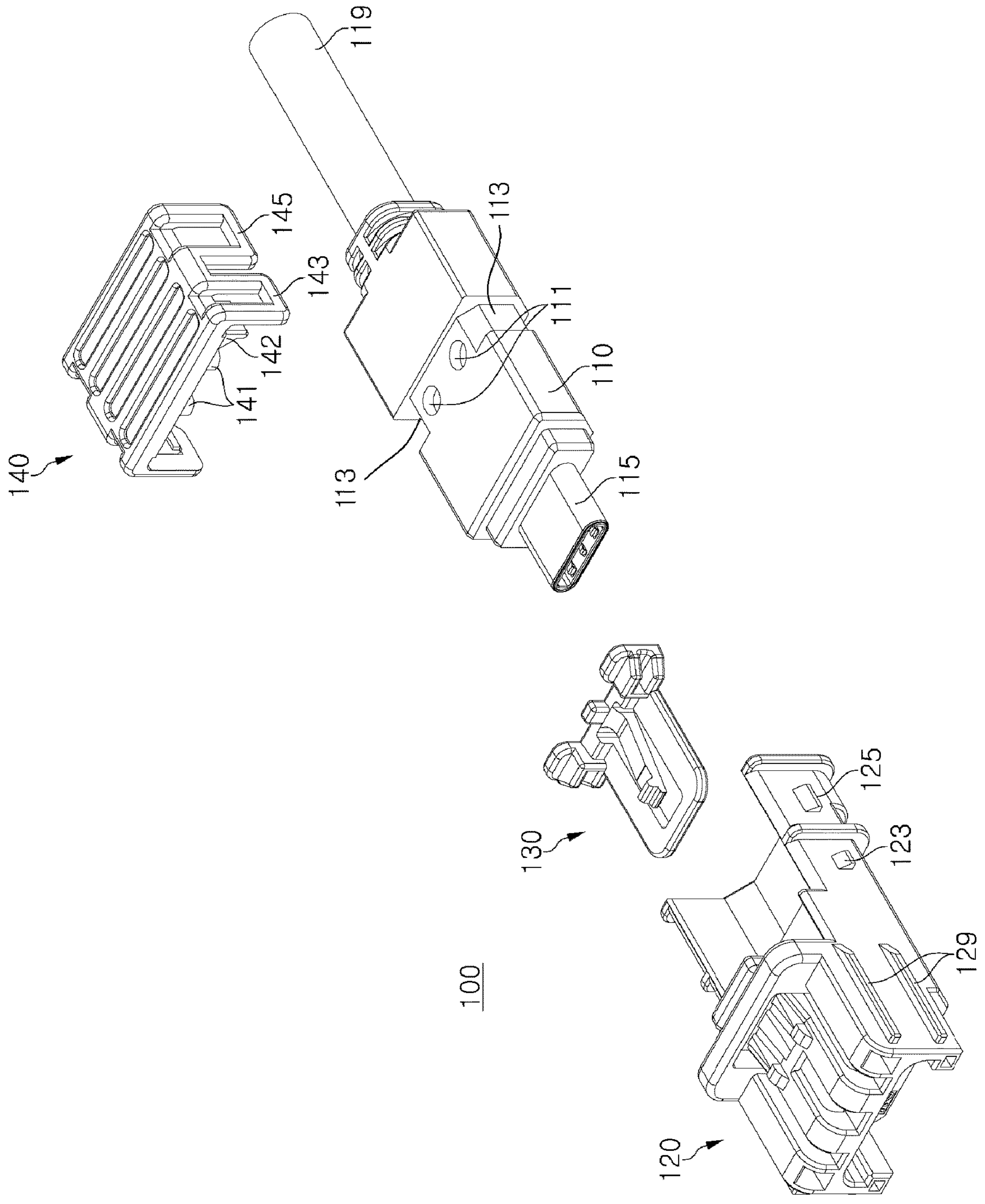
FIG. 4 is an exploded view of the vertical type-C signal transmission connector according to the embodiment.
Figure 5:
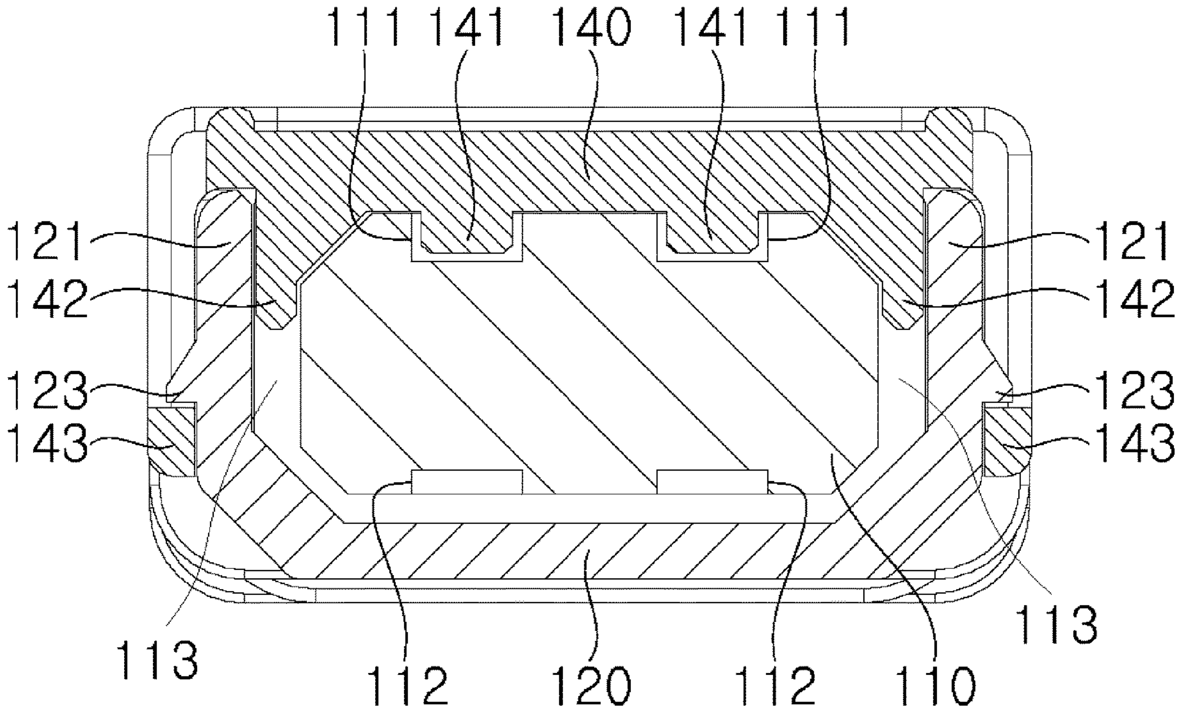
FIG. 5 is a sectional view taken along line A-A' of FIG. 3.
Figure 6:
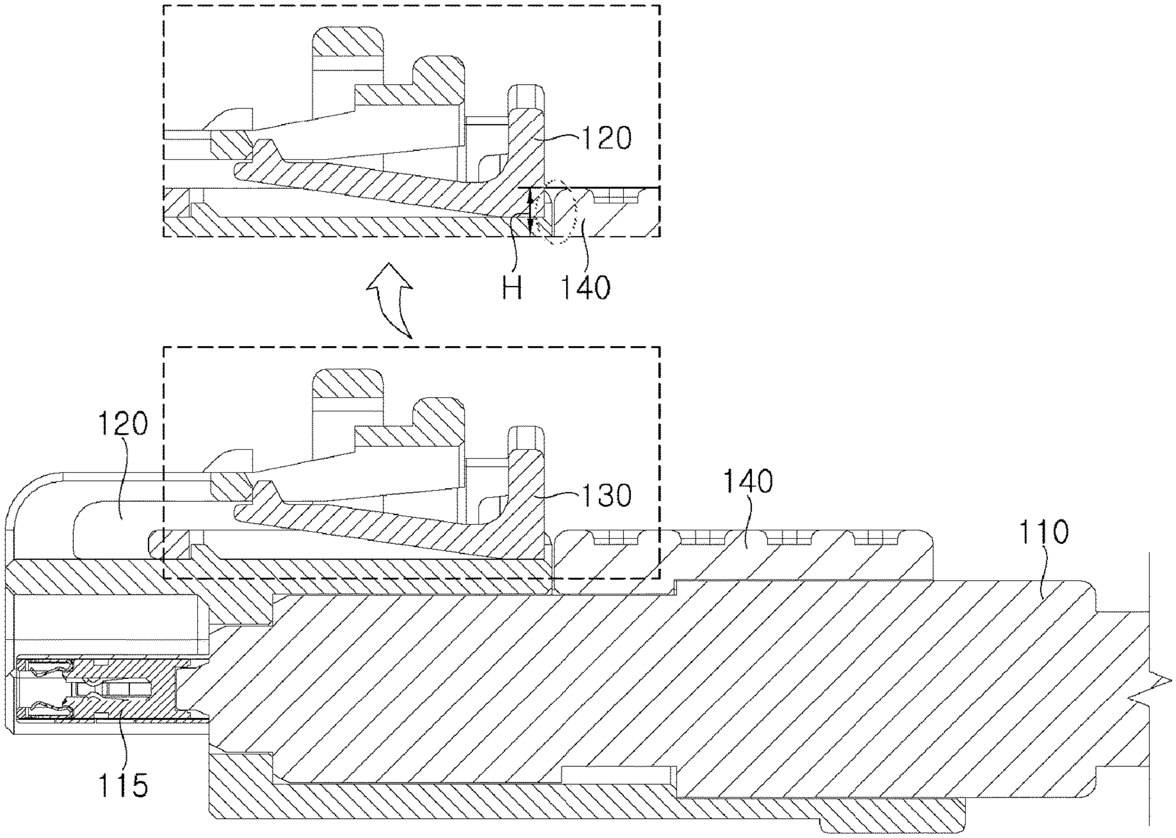
FIG. 6 is a sectional view taken along line B-B' of FIG. 3.
Figure 7:
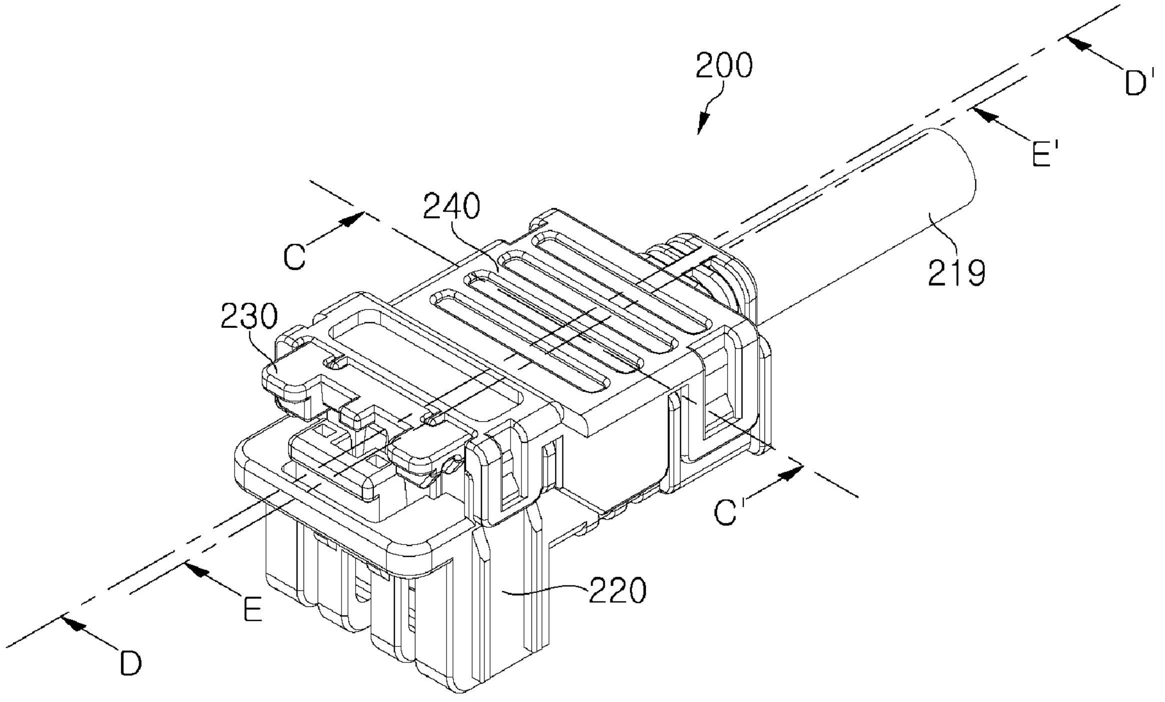
FIG. 7 is a top and bottom perspective view of the right-angled type-C signal transmission connector according to the embodiment.
Figure 7:
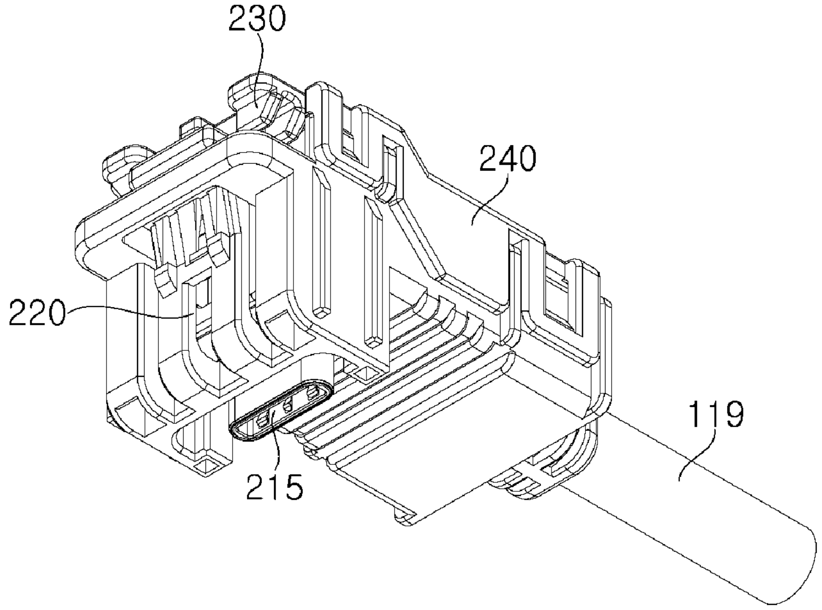
Figure 8:
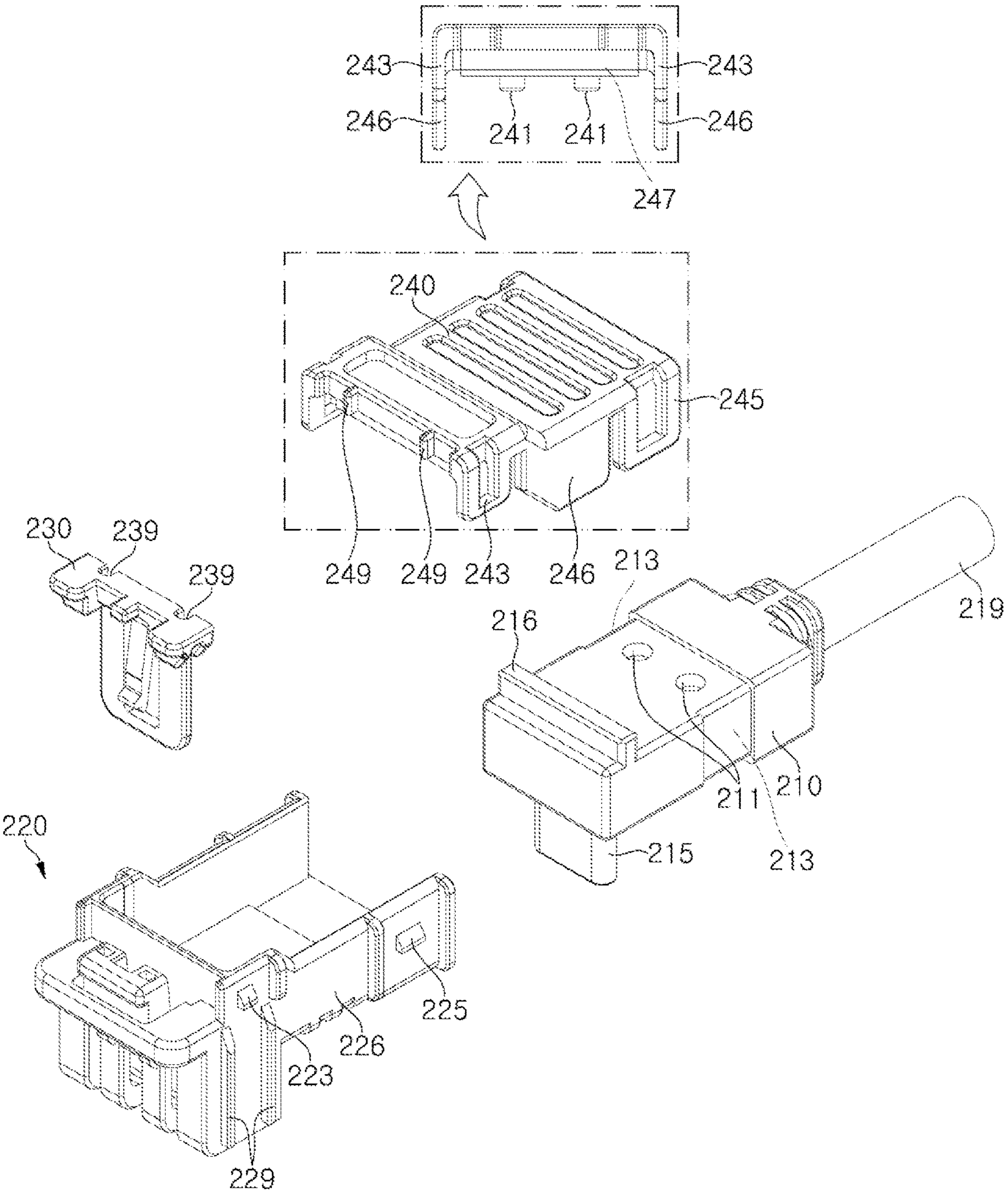
FIG. 8 is an exploded view of the right-angled type-C signal transmission connector according to the embodiment.
Figure 9:
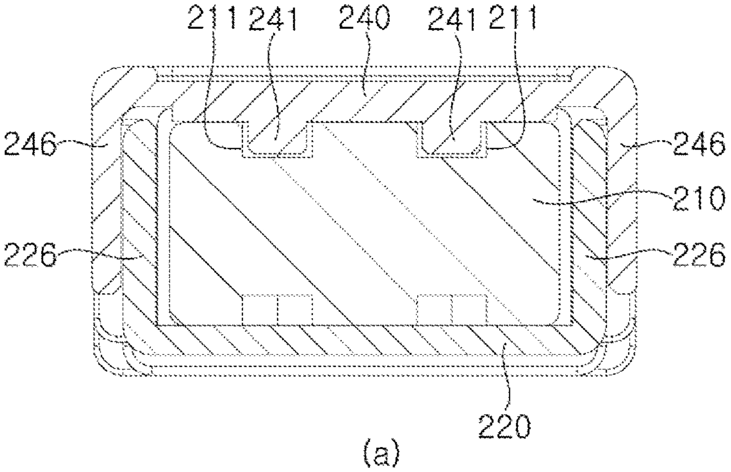
FIG. 9 is a sectional view taken along line C-C' of FIG. 7 and a sectional view taken along line D-D' of FIG. 7.
Figure 9:
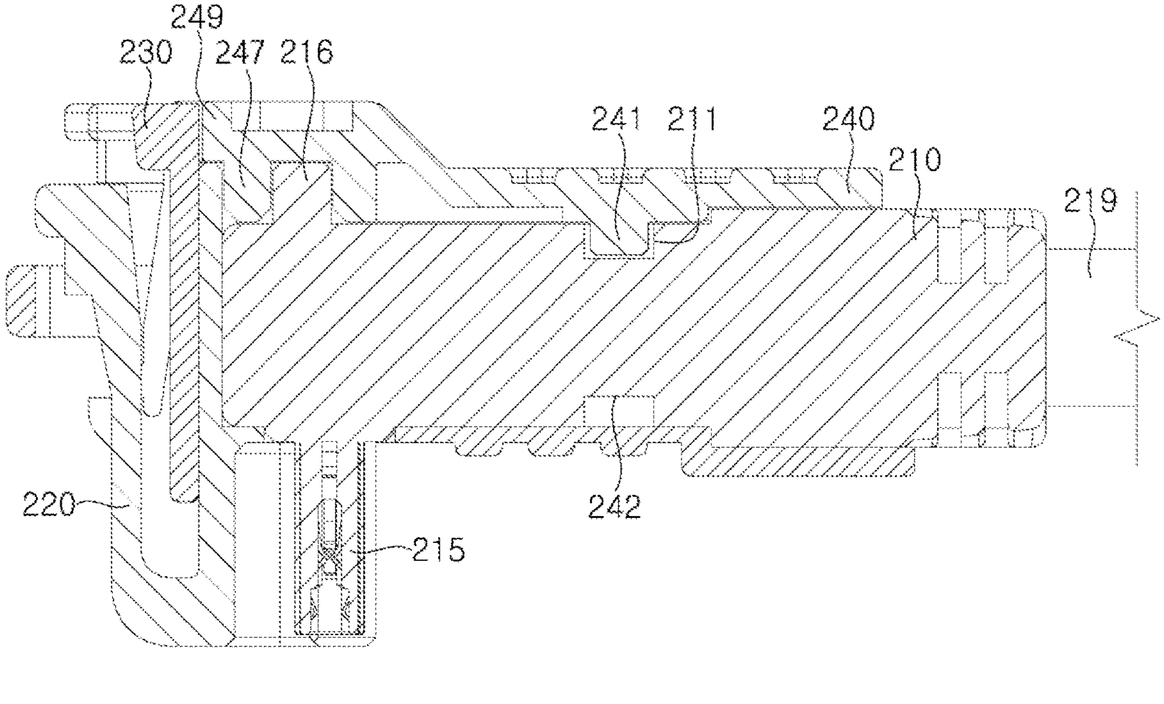
Figure 10:
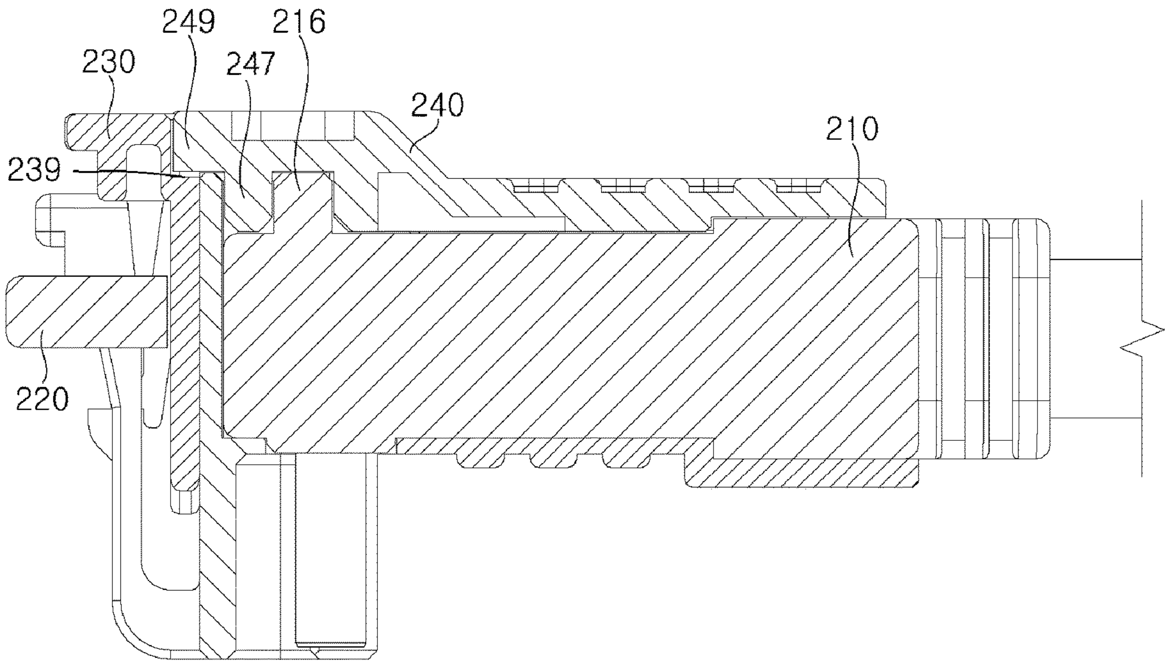
FIG. 10 is a sectional view taken along line E-E' of FIG. 7.
Figure 11:
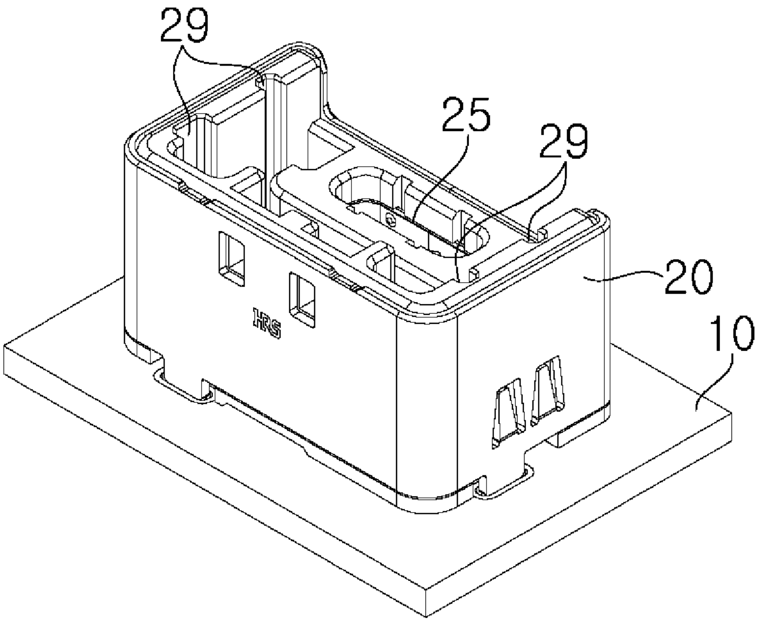
FIG. 11 is a view of a type-C USB port-equipped connector according to one embodiment of the present invention.

FIG. 1 is a view of a vertical type-C signal transmission connector according to one embodiment of the present invention, with a type-C USB port-equipped connector coupled thereto, FIG. 2 is a view of a right-angled type-C signal transmission connector according to one embodiment of the present invention, with a type-C USB port-equipped connector coupled thereto, FIG. 3 is a top and bottom perspective view of the vertical type-C signal transmission connector according to the embodiment, FIG. 4 is an exploded view of the vertical type-C signal transmission connector according to the embodiment, FIG. 5 is a sectional view taken along line A-A' of FIG. 3, FIG. 6 is a sectional view taken along line B-B' of FIG. 3, FIG. 7 is a top and bottom perspective view of the right-angled type-C signal transmission connector according to the embodiment, FIG. 8 is an exploded view of the right-angled type-C signal transmission connector according to the embodiment, FIG. 9 is a sectional view taken along line C-C' of FIG. 7 and a sectional view taken along line D-D' of FIG. 7, FIG. 10 is a sectional view taken along line E-E' of FIG. 7, and FIG. 11 is a view of a type-C USB port-equipped connector according to one embodiment of the present invention.

Referring to FIG. 1 to FIG. 11, the present invention relates to a type-C signal transmission connector and, more particularly, to a type-C signal transmission connector which is used in an automotive media control unit (MCU) module.

Referring to FIG. 1 and FIG. 2, a vertical type-C signal transmission connector 100 (also referred to as a "first type-C signal transmission connector") or a right-angled type-C signal transmission connector 200 (also referred to as a "second type-C signal transmission connector") may be coupled to a type-C USB port-equipped connector 20 mounted on a substrate 10.

In this way, as a type-C signal transmission connector to be coupled to the type-C USB port-equipped connector 20, the vertical type-C signal transmission connector 100 or the right-angled type-C signal transmission connector 200 can be selected depending on the installation space, whereby coupling between the two connectors can be achieved in a manner that suits the installation environment of the automotive media control unit (MCU) module.

Referring to FIG. 3 to FIG. 6, the first type-C signal transmission connector 100 includes an inner housing 110 receiving a USB plug 115 and a cable 119 therein, an outer housing 120 surrounding the inner housing 110, and a retainer 140 mounted on the inner housing 110 and the outer housing 120.

The outer housing 120 may include a connector position assurance (CPA) member 130 coupled thereto, wherein the CPA member 130 is movable in a longitudinal direction of the connector 100.

The inner housing 110 of the first type-C signal transmission connector 100 may include an inner protrusion receiving portion 111 and an outer protrusion receiving portion 113.

The retainer 140 may have outer locking portions 143, 145 coupled and secured to the outer housing 120 and protrusions 141, 142 coupled and secured to the inner housing 110.

Here, the protrusions may include an inner protrusion 141 and an outer protrusion 142, wherein the inner protrusion 141 may be coupled to the inner protrusion receiving portion

111 of the inner housing 110 and the outer protrusion 142 may be coupled to the outer protrusion receiving portion 113 of the inner housing 110.

The inner protrusion 141 of the retainer 140 may include at least two inner protrusions to ensure tight coupling between the inner housing 110 and the retainer 140.

The outer protrusion 142 may include a pair of outer protrusions, and the inner protrusion 141 of the retainer 140 may be disposed between the outer protrusions 142, such that the retainer 140 and the inner housing 110 can be securely held in place.

Thus, through coupling between the retainer 140 and the inner housing 110, the cable 119 can be more securely held in place, thereby increasing pulling force needed to separate the cable 119 from the connector 100.

The outer locking portions 143, 145 of the retainer 140 may be caught by catching portions 123, 125 of the outer housing 120, such that the retainer 140 can be prevented from being separated from the outer housing 120 by impact or vibration.

In addition, in order to facilitate coupling to the type-C USB port-equipped connector 20, the outer housing 120 may include a guide portion 129 to guide the outer housing 120 to a proper coupling position.

Referring to FIG. 6, when the CPA member 130 is released, the retainer 140 may limit the range of movement of the CPA member 130 to prevent the CPA member 130 from being separated from a product. In addition, the retainer 140 may include a protrusion protruding upwards therefrom to prevent the CPA member 130 from being separated rearwards from the outer housing 120, thereby assuring that the cable is held in place and thus preventing electrical failure.

That is, upon coupling the retainer 140 to the outer housing 120, a section is formed in which the protrusion of the retainer 140 and the CPA member 130 overlap by a predetermined height H, thereby preventing the CPA member 130 from being separated rearwards from the outer housing 120.

Referring to FIG. 7 to FIG. 10, the second type-C signal transmission connector 200 includes an inner housing 210 receiving a USB 215 and a cable 219 therein, an outer housing 220 surrounding the inner housing 210, and a retainer 240 mounted on the inner housing 210 and the outer housing 220.

The outer housing 220 may include a connector position assurance (CPA) member 230 coupled thereto, wherein the CPA member 230 is moveable in a perpendicular direction with respect to a longitudinal direction of the connector 200.

The inner housing 210 of the second type-C signal transmission connector 200 may include an inner protrusion receiving portion 211.

The outer housing 220 of the second type-C signal transmission connector 200 may have a right-angled shape.

The retainer 240 may include outer locking portions 243, 245 coupled and secured to the outer housing 220 and protrusions 241, 247 coupled and secured to the inner housing 210.

Here, the protrusions may include an inner protrusion 241 and an outer protrusion 247, wherein the inner protrusion 241 may be coupled to the inner protrusion receiving portion 211 of the inner housing 210 and the outer protrusion 247 may be caught by and coupled to a protrusion 216 of the inner housing 210.

The inner protrusion 241 of the retainer 240 may include at least two inner protrusions to ensure tight coupling between the inner housing 210 and the retainer 240.

The outer locking portions 243, 245 of the retainer 240 may be caught by catching portions 223, 225 of the outer housing 220, respectively, such that the retainer 240 can be prevented from being separated from the outer housing 220 by impact or vibration.

In addition, in order to facilitate coupling to the type-C USB port-equipped connector 20, the outer housing 220 may include a guide portion 229 to guide the outer housing 220 to a proper coupling position.

Referring to FIG. 9 and FIG. 10, when the CPA member 230 is released, the retainer 240 may limit the range of movement of the CPA member 230 to prevent the CPA member 230 from being separated from a product. In addition, the retainer 240 may include a stopper 249 protruding from one side thereof in a longitudinal direction of the connector 200 with the CPA member 230 coupled thereto to prevent the CPA member 230 from being separated rearwards from the outer housing 220, thereby assuring that the cable is held in place and thus preventing electrical failure.

That is, upon coupling the retainer 240 to the outer housing 220, the stopper 249 of the retainer 240 is inserted into a receiving groove 239 of the CPA member 230 to form a section in which the retainer 240 and the CPA member 230 overlap each other, whereby the CPA member 230 is caught by the stopper 249 and thus can be prevented from being separated rearwards from the outer housing 220.

FIG. 11 is a view of a type-C USB port-equipped connector according to one embodiment of the present invention. After the type-C USB port-equipped connector 200 is mounted on a substrate 10, the vertical type-C signal transmission connector 100 (that is, the first type-C signal transmission connector) or the right-angled type-C signal transmission connector 200 (that is, the second type-C signal transmission connector) may be coupled to the connector 20. The type-C USB port-equipped connector 200 may include a type-C USB port 25 adapted for a type-C USB plug to be coupled thereto and a guide groove 29 adapted for the guide portion of the outer housing of the type-C signal transmission connector to be coupled thereto and received therein.

In the type-C signal transmission connector according to the present invention, the inner housing receiving an USB and a cable therein includes an inner protrusion receiving portion and an outer protrusion receiving portion such that, upon coupling the inner housing to the retainer, an inner protrusion and an outer protrusion of the retainer are inserted into and caught by the inner protrusion receiving portion and the outer protrusion receiving portion, respectively, to double-fasten both sides of the cable, thereby preventing the cable from being withdrawn from the connector.

In addition, according to the embodiments of the present invention, with the outer locking portion of the retainer caught by the catching portion of the outer housing, the inner housing and the outer housing can be held in place, and, with the CPA member, it is possible to assure that the cable is held in place, thereby preventing electrical failure.

In addition, according to the embodiments of the present invention, as a type-C signal transmission connector to be coupled to the type-C USB port-equipped connector, the vertical type-C signal transmission connector or the right-angled type-C signal transmission connector can be selected depending on the installation space, whereby coupling between the two connectors can be achieved in a manner that suits the installation environment of an automotive media control unit (MCU) module.

In addition, according to the embodiments of the present invention, the connector position assurance (CPA) member is caught by the retainer and thus can be prevented from moving out of place, thereby assuring that the cable is held in place and thus preventing electrical failure.

Although the type-C signal transmission connector according to the present invention has been described with reference to some embodiments, it will be understood that the embodiments described herein may be embodied in a variety of other forms without departing from the spirit and scope of the invention.

Therefore, the scope of the invention should not be limited to the forgoing embodiments, and should be defined by the accompanying claims and equivalents thereto.

That is, it should be understood that the forgoing embodiments are provided for illustration only and are not to be construed in any way as limiting the present invention. In addition, the scope of the present invention is indicated by the following claims rather than the detailed description of the embodiments, and all changes or modifications derived from the meaning and scope of the claims and equivalents thereto should be construed as being within the scope of the present invention.

| <List of Reference numerals> | |
|---|---|
| 10: Substrate | 20: Connector |
| 25: Type-C USB Port | 29: Guide groove |
| 100: First type-C signal transmission connector | |
| 110: Inner housing | 114: Type-C USB plug |
| 119: Plug cable | 120: Outer housing |
| 130: CPA member | 140: Retainer |
| 200: Second type-C signal transmission connector | |
| 210: Inner housing | 215: Type-C USB plug |
| 219: Plug cable | 220: Outer housing |
| 230: CPA member | 240: Retainer |

The invention claimed is:

1. A type-C signal transmission connector comprising:

an inner housing receiving a USB plug and a cable therein;

an outer housing surrounding the inner housing; and a retainer mounted on the inner housing and the outer housing, wherein the retainer has an outer locking portion and a protrusion, the outer locking portion is caught by a catching portion formed on the outer housing, the protrusion of the retainer comprises an inner protrusion and an outer protrusion, the inner protrusion is coupled to an inner protrusion receiving portion formed on the inner housing, and the outer protrusion is coupled to an outer protrusion receiving portion formed on the inner housing.

2. The type-C signal transmission connector according to claim 1, wherein the inner protrusion comprises at least two inner protrusions.

3. The type-C signal transmission connector according to claim 1, wherein the outer protrusion comprises a pair of outer protrusions, and the inner protrusion is located between the pair of outer protrusions.

4. The type-C signal transmission connector according to claim 3, wherein the outer housing comprises a CPA member coupled thereto, the CPA member being movable in a longitudinal direction of the connector.

5. The type-C signal transmission connector according to claim 4, wherein the retainer limits a range of movement of the CPA member.

6. The type-C signal transmission connector according to claim 4, wherein the protrusion of the retainer prevents the CPA member from being separated rearwards from the outer housing.

7. The type-C signal transmission connector according to claim 1, wherein the outer protrusion is located in front of the inner protrusion.

8. The type-C signal transmission connector according to claim 7, wherein the outer housing comprises a CPA member coupled thereto, the CPA member being movable in a perpendicular direction with respect to a longitudinal direction of the connector.

9. The type-C signal transmission connector according to claim 8, wherein the retainer has a stopper inserted into a receiving groove formed on the CPA member to form a section in which the retainer and the CPA member overlap each other, whereby the CPA member is caught by the stopper to be prevented from being separated rearwards from the outer housing.

10. The type-C signal transmission connector according to claim 7, wherein the outer housing has a right-angled shape.

* * * * *